(12) United States Patent
Morel et al.

(10) Patent No.: US 8,893,234 B2
(45) Date of Patent: Nov. 18, 2014

(54) METHOD OF SECURING ACCESS TO A PROXIMITY COMMUNICATION MODULE IN A MOBILE TERMINAL

(75) Inventors: Thierry Morel, Eterville (FR); François Boudet, Fierville Bray (FR); Alan Kerdraon, Caen (FR)

(73) Assignee: Orange, Paris (FR)

( * ) Notice: Subject to any disclaimer, the term of this patent is extended or adjusted under 35 U.S.C. 154(b) by 377 days.

(21) Appl. No.: 12/297,768

(22) PCT Filed: Apr. 19, 2007

(86) PCT No.: PCT/FR2007/051141
§ 371 (c)(1), (2), (4) Date: Oct. 20, 2008

(87) PCT Pub. No.: WO2007/119032
PCT Pub. Date: Oct. 25, 2007

(65) Prior Publication Data
US 2009/0106824 A1 Apr. 23, 2009

(30) Foreign Application Priority Data
Apr. 19, 2006 (FR) ...................................... 06 51371

(51) Int. Cl.
*H04L 29/06* (2006.01)
*H04W 12/06* (2009.01)
*H04W 88/02* (2009.01)

(52) U.S. Cl.
CPC .............. *H04W 12/06* (2013.01); *H04W 88/02* (2013.01)

USPC ............... 726/4; 455/420; 455/558; 340/5.31

(58) Field of Classification Search
CPC ............................. H04W 88/02; H04W 12/06
USPC ............................................... 726/4; 455/558
See application file for complete search history.

(56) References Cited

U.S. PATENT DOCUMENTS 5,898,783 A * 4/1999 Rohrbach ................... 340/5.31
7,053,771 B2   5/2006 Hussmann
(Continued)

FOREIGN PATENT DOCUMENTS

CN   1487763 A   4/2004
CN   1623346 A   6/2005
(Continued)

OTHER PUBLICATIONS

Knospe, H., Pohl, H., "RFID security," Information Security Technical Report, vol. 9, Issue 4, Dec. 2004, pp. 39-50, ISSN 1363-4127.*
(Continued)

*Primary Examiner* — Carl Colin
*Assistant Examiner* — Syed Zaidi
(74) *Attorney, Agent, or Firm* — Knobbe Martens Olson & Bear LLP

(57) ABSTRACT

A method of securing access to a near-field communication module (30) included in a terminal (10) comprising a security device (20) adapted to be blocked remotely and including a security component (32) connected to wireless communication means (33, 34). The method includes a step of storing security data in the security device (20) and a step of authentication of the security device (20) by the security component (32) of the near-field communication module (30) as a function of the security data stored in the security device (20).

9 Claims, 2 Drawing Sheets

(56) References Cited

U.S. PATENT DOCUMENTS

| | | | | |
|---|---|---|---|---|
| 2002/0032601 | A1* | 3/2002 | Admasu et al. | 705/13 |
| 2003/0218532 | A1* | 11/2003 | Hussmann | 340/5.8 |
| 2004/0005911 | A1* | 1/2004 | Guirauton et al. | 455/558 |
| 2006/0226951 | A1* | 10/2006 | Aull et al. | 340/5.61 |
| 2007/0123305 | A1* | 5/2007 | Chen et al. | 455/558 |
| 2008/0293397 | A1* | 11/2008 | Gajdos et al. | 455/420 |

FOREIGN PATENT DOCUMENTS

| | | |
|---|---|---|
| EP | 1 379 093 | 1/2004 |
| GB | 2 380 356 A | 4/2003 |
| JP | 2002-539553 A | 11/2002 |
| JP | 2006-013659 | 1/2006 |
| WO | WO 00/55717 | 9/2000 |
| WO | WO 03/081934 | 10/2003 |
| WO | WO 2005/079038 | 8/2005 |
| WO | WO 2006122700 A2 * | 11/2006 |

OTHER PUBLICATIONS

Juels, A.; Molnar, D.; Wagner, D.; , "Security and Privacy Issues in E-passports," Security and Privacy for Emerging Areas in Communications Networks, 2005. SecureComm 2005. First International Conference on , vol., No., pp. 74-88, Sep. 5-9, 2005.*

J. Noll, J. C. L. Calvet, and K. Myksvoll. Admittance services through mobile phone short messages. ICWMC, 1:77, 2006.*

Noll, J. O. S. E. F. "Services and applications in future wireless networks." Telektronikk 102.3/4 (2006): 61.*

J.C.L. Calvet, "The role of RFID in the mobile phone", Telektronikk, No. 3, pp. 131-142, Apr. 2005, XP002417982, http://www.telenor.com/telektronikk.volumes/pdf/3_4.2005/Page_131-142.pdf.

Notice of Reasons for Rejection mailed Dec. 18, 2012 for corresponding Japanese Application No. 2009-505943.

Decision to Reject the Amendments and Decision of Rejection mailed by the Japanese Patent Office on Apr. 9, 2013 for corresponding Japanese Patent Application No. 2009-505943.

* cited by examiner

METHOD OF SECURING ACCESS TO A PROXIMITY COMMUNICATION MODULE IN A MOBILE TERMINAL

RELATED APPLICATIONS

This is a U.S. National Phase Application under 35 USC §371 of International Application PCT/FR2007/051141, filed on Apr. 19, 2007.

This application claims the priority of French application no. 06/51371 filed on Apr. 19, 2006, and the content of which is hereby incorporated by reference.

FIELD OF THE INVENTION

The present invention relates to the fields of long-distance and of short-distance mobile telecommunications and of electronic payment and of access control using contactless card devices. It is more particularly concerned with mobile terminals equipped with a contactless near-field communication (NFC) module executing some security functions.

BACKGROUND OF THE INVENTION

A mobile telephone comprises a number of elements dedicated to various functions offered to users. The main elements at present are:
- a keypad enabling users to communicate data to their telephones;
- a screen enabling telephones to communicate with their users;
- a microphone and a loudspeaker providing voice communication;
- a radio communication element (for example of the GSM type) providing long-distance communication over the network of the telecommunications carrier;
- a memory for storing data specific to the operation of the telephone or personal to the user;
- a subscriber smart card (for example a SIM or USIM card), which remains the property of the telecommunications carrier with whom the user has a contract and provides cryptography functions enabling in particular mutual authentication with the network;
- various "camera" type peripherals or Bluetooth™ Irda™, Wifi™, etc. communication ports;
- an operating system (for example Windows Mobile™) and associated electronics (processor means) for managing all elements of the mobile device and providing communication between them;
- possibly a removable memory card or MMC (multimedia memory card) with a format that varies as a function of the terminal (SD, miniSD, etc.).

Some mobile telephones have recently been provided with an ISO 14443 family contactless smart card type near-field communication module. This module is a contactless microchip comprising a set of components that is integrated into the mobile telephone, one of which components provides security component functions (secret data necessary for a contactless transaction, authentication, encryption, signature, etc.), for example the Philips™ Smart MX circuit. Note that some or all of this microchip (in particular the NFC security component) can equally be integrated into a removable memory card if the telephone incorporates one. The contactless microchip uses the NFC or ISO 14443 technology.

NFC microchips include an antenna and an electronic circuit and the most sophisticated examples can transmit, receive and process information via the antenna, which is also used to transmit the power needed by the microchip. NFC microchips include a security component able to store data, to control access thereto and broadcasting thereof, and to perform algorithm-based functions (encryption, identification/authentication, signature). To enable a very short response time (less than 300 milliseconds (ms) or even 140 ms), it is necessary for the NFC microchip, which processes the data exchanged on the near-field radio-frequency channel, to be connected directly to the antenna.

A mobile telephone with an NFC microchip can perform a number of operations such as secure electronic payment, opening doors or barriers, facilitating downloading of multimedia contents (tunes, videos, etc.). To perform these operations, the user places a mobile telephone including an NFC microchip near an NFC microchip reader associated with the corresponding device (payment terminal, access point, etc.).

To enable the user to consult/manage some of the data stored in the NFC microchip (for example to display on the screen of the telephone information contained in the NFC microchip such as the number of payment tickets remaining or to activate/deactivate a particular function), applications in the mobile telephone must be able to recover information stored in the security component of the NFC microchip.

As for any security element, some information stored in the NFC microchip is protected and can be read or modified only after authentication (for example by means of a "triple DES" encryption algorithm). Secret data (for example encryption/decryption keys) and calculation means capable of performing rapidly a cryptographic calculation that can be complex are necessary for effecting such authentication.

The secret data necessary for authentication by the security component of the NFC microchip is stored in the memory of the mobile telephone. Storing this secret data in the mobile telephone and effecting calculations in the mobile telephone (for example by means of a Java® Midlet application using RMS (rights management system) keys), offers the benefit of enhanced security through authentication of the user.

The subscriber smart card of a mobile telephone that has been declared stolen can be disabled, i.e. blocked, by the carrier. However, the mobile telephone could nevertheless be used for near-field ("contactless") communication with the NFC microchip simply by inserting into the telephone another subscriber smart card that is not blocked.

Consequently, the security and control of the NFC microchip must be improved to guarantee users improved protection in the event of theft or loss of their mobile telephone.

OBJECT AND SUMMARY OF THE INVENTION

One object of the present invention is to provide better control of secure access to data in the NFC microchip and consequently of use of the NFC module, especially in the event of loss or theft of the terminal.

This and other objects are attained in accordance with one aspect of the invention directed to a method of securing access to a near-field communication module included in a terminal including a security device adapted to be blocked remotely and including a security component connected to wireless communication means (for example short or very short range radio transmission or infrared transmission means). The method includes a step of storing security data in the security device and a step of the security component of the near-field communication module authenticating the security device as a function of the security data stored in the security device.

Storing the security data necessary for authentication by the NFC module in the security device greatly improves the security and control of the near-field communication module.

Blocking access to the security data stored in the security device, for example following theft or loss of the terminal, prevents authentication of the security device by the near-field communication module. Thus all actions carried out with the near-field communication module requiring authentication of the security device by that module (for example consultation/modification of data in the security component) can be prohibited.

The security data stored in the security device in the terminal can in particular comprise one or more personal identification numbers, possibly stored in protected (for example encrypted) form, and one or more cryptography keys. It is therefore possible to choose the level of authentication (simple or strong) as a function of the data stored in the security device.

For simple authentication, the operating system of the terminal sends the security component of the near-field communication module one or more personal identification numbers stored in the security device, each personal identification number sent being compared with a code prestored in the security component of the near-field communication module.

For more sophisticated authentication (strong authentication), the security data in the security device can correspond to one or more cryptography keys and to cryptography calculation programs so that the security device effects an electronic signature by means of the cryptography key in response to an authentication request sent by the security component of the near-field communication module. That signature is then returned by the operating system to the security component for verification.

Another aspect of the invention is directed to a security device adapted to be blocked remotely and intended to be included in a terminal including a near-field communication module including a security component connected to wireless communication means. The security device includes means for storing and protecting security data and means for transmitting said security data or data calculated from said security data in response to a request for authentication of the security component of the near-field communication module.

Furthermore, with a security device of the above kind, the telecommunications carrier can control use of the near-field communication module. Remotely blocking access to the security data in the security device necessary for authentication by the near-field communication module prohibits all actions performed with the near-field communication module and requiring authentication.

Another aspect of the invention is directed to a near-field communication module including a security component connected to wireless communication means and intended to be included in a mobile terminal including a security device in which security data is stored. The module includes processor means for authenticating the security device as a function of the security data stored in the security device.

Another aspect of the invention is directed to a computer program intended to be executed in a terminal including a security device adapted to be blocked remotely and a near-field communication module including a security component connected to wireless communication means. The computer program comprises instructions for authenticating the security device as a function of received data.

Another aspect of the invention is directed to a terminal including a near-field communication module including a security component connected to wireless communication means and a security device, both as described above.

As explained above, such terminals enhance the security of the onboard near-field communication module.

BRIEF DESCRIPTION OF THE DRAWINGS

Features and advantages of the present invention emerge more clearly from the following description, given by way of non-limiting illustration and with reference to the appended drawings, in which.

DETAILED DESCRIPTION OF EMBODIMENTS OF THE INVENTION

The present invention applies to any type of terminal, in particular a mobile terminal (mobile telephone, communicating PDA, smartphone, etc.) using a security device and including a near-field communication module enabling wireless communication (short or very short range radio transmission, infrared transmission, etc.). In the remainder of the description the near-field communication module provides communication by very short range radio-frequency transmission.

The security device considered in the context of the present invention is any type of security device that is used in a telecommunications terminal to enable the user to access a mobile telecommunications network and can be blocked remotely via the telecommunications network (for example by the mobile telephone carrier). One of the best known security devices used in such terminals is a smart card comprising processor means (microcontroller) and memory means. This card is known as a SIM (subscriber identity module) card, a USIM (universal subscriber identity module) card or a UICC (UMTS integrated circuit card).

In the remainder of the description, the security device that can be blocked remotely is described in relation to a subscriber smart card in the form of a SIM card.

Figure 1:
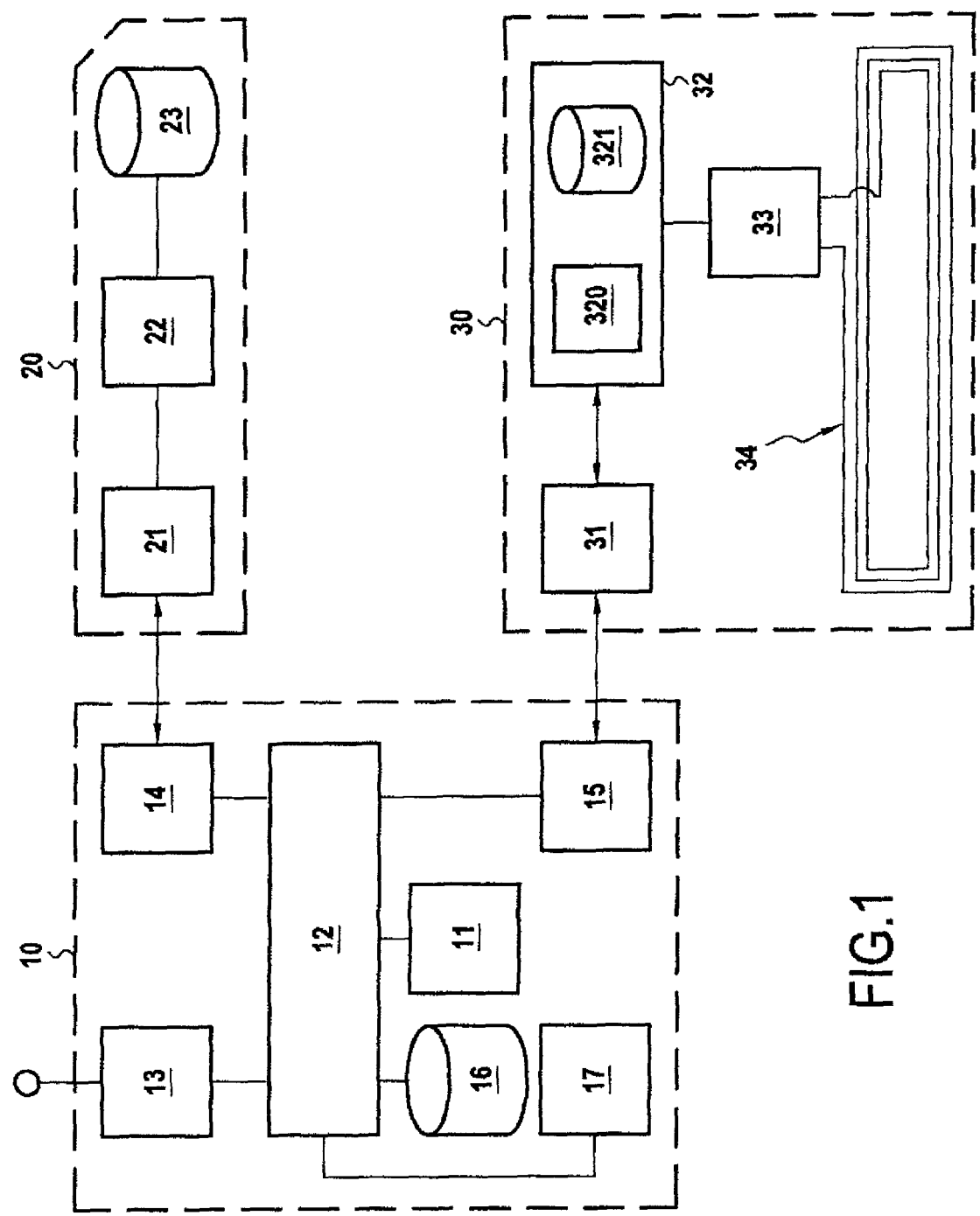
FIG. 1 is a diagrammatic view of a functional architecture in which the method of the invention of securing access to a near-field communication module is implemented.

FIG. 1 shows a functional architecture in which the invention is implemented and that comprises a mobile telephone 10, a subscriber smart card 20, and a near-field communication (NFC) module 30.

The mobile telephone 10 has a user interface 11 (keypad, screen, microphone, loudspeaker), an operating system 12, an access network (for example a GSM, GPRS or UMTS network) interface 13, an interface 14 for communication with the subscriber smart card 20, an interface 14 for communication with the near-field communication (NFC) module, and a memory unit 16. The operating system 12 is a computer program that controls the various functions of the mobile terminal and interaction between the elements of the terminal (for example keypad, screen, subscriber smart card, etc.). According to the invention, the operating system 12 also controls communication between the subscriber smart card and the near-field communication module.

The subscriber smart card 20 is a security device that remains the property of the telecommunications carrier (for example Orange™) with which the user of the mobile telephone has a contract. This smart card is necessary for the telephone to function. It is, for example, a SIM (subscriber identity module) card or a USIM (universal subscriber identity) card, also known as a UMTS integrated circuit card (UICC). Among other things, this card authenticates the user on a mobile telecommunications network and provides access to value-added services such as messaging, monitoring of consumption, customer service, etc.

The subscriber smart card comprises a communications interface 21, processor means 22 (for example a programmable microprocessor), and storage memory 23. The invention uses the storage memory 23 to store, in addition to the data usually stored in it, the security data necessary for authentication of the subscriber smart card by the security component of the near-field communication module. As described in detail below, the storage memory 23 can store personal identification number and cryptography key type security data. One or more cryptography calculation programs can also be stored in the memory 23 or in another memory, for example that of the terminal, and executed by the processor means 22 during authentication. The processor means 22 are specifically programmed to respond to an authentication request sent by the security component of the near-field communication module, for example by sending back a personal identification number stored in the memory 23 or executing encryption/decryption functions using cryptography calculation programs and the cryptography key or keys stored in the subscriber smart card.

The mobile telephone 10 and the security device 20 communicate via the interfaces 14, 21 standardized by the ETSI (European Telecommunication Standards Institution) and access to which via API (application interfaces) is standardized by Java™ Forum recommendation JSR177.

The near-field communication module 30 comprises an interface 31 for communication with the mobile telephone, a security component 32, an analog NFC circuit 33, and an multiturn antenna 34. The security component 32 is a smart card circuit and comprises a storage memory 321 and processor means 320 (for example a programmable microprocessor) specifically programmed to execute in particular functions for securing exchange of digital information such as cryptography, personal identification number verification, electronic signature verification, etc. functions.

The analog NFC circuit 33 includes analog components for sending/receiving digital data contained in or generated by the security component 32 via the antenna 34. This is known in itself. The analog NFC circuit 33 also includes analog components (for example a capacitor) able to store energy received via electromagnetic waves transmitted from the NFC chip reader device and to supply that energy to the security component 32 to enable it to function.

The near-field communication module 30 can be implemented in the terminal in various forms, for example in the form of an electronic circuit integrated into the terminal. It can equally be implemented in whole or in part in the form of a removable memory card such as an MMC (multimedia memory card), the format of which varies as a function of the type of terminal (for example an SD or MiniSD format memory card).

The structure and the operation of the near-field communication module NFC are similar to those of the well-known RFID labels. The NFC technology enables the user to access wireless services or to exchange information merely by placing the mobile terminal near other NFC-compatible devices (i.e. devices including an NFC reader), for example interactive devices. The NFC technology is distinguished by its high transmission speed (more than 200 kbps) and its low cost.

The mobile telephone 10 and the near-field communication module 30 communicate via the interfaces 15, 31 that are at present being standardized by Java™ Forum recommendation JSR257.

The subscriber smart card 20 can be blocked (i.e. disabled) remotely via the telecommunications network. Access to the telecommunications network and/or to the security data stored in the subscriber smart card 20 can be blocked remotely. Remotely blocking a subscriber smart card to prevent access to the telecommunications network is well known in itself and is not described in detail here.

Access to the security data stored in the subscriber smart card 20 can be blocked remotely by remote access via the telecommunications network to a specific file in the memory 23 of the card with parameters that can be set according to two states, namely an unblocked state enabling the security component 32 to access the security data stored in the memory 23 of the card and a blocked state preventing such access. The file state parameter can be set remotely by updating the file by sending an SMS message containing the new state to be stored. The processor means 22 are then programmed to consult the file state (blocked or unblocked) first on receiving an authentication request sent by the security component of the near-field communication module. The processor means 22 can then respond to the authentication request or not, depending on the file state.

When it is desired at the same time also to block access to the telecommunications network (for example in the event of loss or theft of the terminal), it is necessary to begin by blocking access to the security data stored in the subscriber smart card 20 (by updating the state file).

By blocking access to the security data stored in the subscriber smart card the present invention prevents any use of the near-field communication module requiring authentication of the subscriber smart card.

According to the invention, any authentication necessary for the security component of the near-field communication module is effected as a function of security data stored in the subscriber smart card of the mobile telephone. The nature of the security data stored in the subscriber smart card depends on the type and level of authentication required by the security component. For example, this data can comprise one or more personal identification numbers, possibly stored in the subscriber smart card in encrypted form, one or more secret keys associated with corresponding cryptography algorithms, challenge resolution algorithms, etc.

The security component can initiate the authentication operation in various circumstances. Authentication can in particular be requested when the user wishes to access via their mobile phone (to display on the screen) data stored in the security component (for example to consult the balance of an electronic payment account or to activate/deactivate a particular function in the module (for example automatic access to a secure place)). It can also be employed when using the near-field communication module NFC to validate an electronic payment or to access a secure place.

Figure 2:
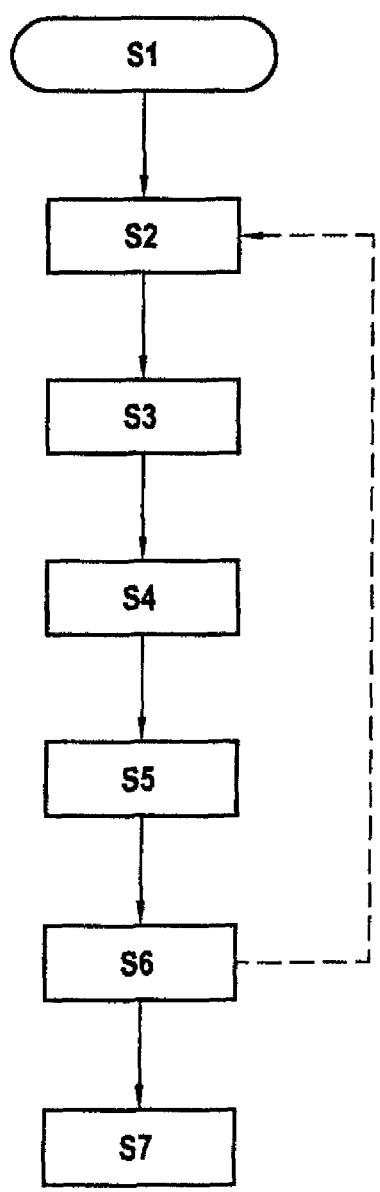
FIG. 2 is a flowchart of one embodiment of an authentication operation of one embodiment of the invention.

FIG. 2 shows the steps executed during an authentication operation conforming to one embodiment of the invention. The embodiment of the method of the invention described with reference to FIG. 2 naturally includes a preliminary step of storing on the subscriber smart card security data needed for authentication of the subscriber smart card by the security component of the near-field communication module. The same security data, or corresponding data, is also stored in the memory of the security component of the near-field communication module.

A first step S1 corresponds to an event initiating an authentication request by the security component 32 of the near-field communication module 30. That event can, for example, correspond to reception by the near-field communication module of an electronic payment validation request from a payment terminal including an NFC reader or an access authorization request coming from an automatic opening device (barrier gate) including an NFC reader. The event can equally be an event internal to the mobile telephone, i.e. one that does not use the near-field communication functions of the near-field communication module, for example the user seeking to view or modify data stored in the memory 321 of the security component 32 to which there is no unrestricted access.

If authentication is necessary, the security component 32 sends an authorization request to the operating system 12 of the mobile telephone 10 (step S2). The content of this request depends on the type and level of authentication used by the security component at the time. The request can simply request a personal identification number (simple authentication) or an electronic signature (signature/challenge).

The authentication request received by the operating system 12 of the mobile telephone 10 is passed to the subscriber smart card 20 (step S3). The processor means 22 of the subscriber smart card then process the request (step S4) and send the operating system 12 a response to this request (step S5) established using security data stored in the memory of the subscriber smart card. The operating system 12 forwards the response provided by the subscriber smart card 20 to the security component 32 of the near-field communication module 30 (step S6). The processor means 320 of the security component 32 then verify the validity of the response and therefore the validity of the authentication (step S7). Thus the processor means 320 of the security component 32 can authenticate the subscriber smart card.

In simple authentication, the security component 32 sends a personal identification number request in the step S2. In the step S3, the operating system 12 sends this request to the subscriber smart card 20. In the step S4, the processor means 22 of the subscriber smart card read the corresponding personal identification number in the memory of the card, and send it back to the operating system 12 in the step S5. The operating system forwards this code to the security component in the step S6. In the step S7, the processor means 320 of the security component 32 compare the personal identification number extracted from the subscriber smart card with a reference code stored in the memory 321 of the security component. If the code received is identical to the reference code, authentication of the subscriber smart card by the security component has succeeded. In this example, the security data simply corresponds to one or more personal identification numbers stored in the memory of the subscriber smart card.

In strong authentication, for example signature/challenge authentication, the security component 32 sends in the step S2 a request including a message M to be encrypted. In the step S3, the operating system 12 forwards this request to the subscriber smart card 20. In the step S4, the processor means 22 of the subscriber smart card encrypt the message M using a cryptography function f and a key k stored in the memory 23 of the subscriber card 20 to form an encrypted or signed message M'=f(M) (fingerprint generation). The processor means 22 of the subscriber smart card 20 send the encrypted message M' to the operating system 12 in the step S5. The operating system forwards the message M' to the security component 32. In the step S7, the processor means 320 of the security component verify that they can decrypt the message M' using their key. If so, the security component can be sure that the subscriber smart card has the secret key k and that authentication of the subscriber smart card by the communication module has succeeded.

In this example, the security data stored and used in the subscriber smart card is cryptography data that includes not only secret data (keys) but also cryptography calculation algorithms for effecting calculations on challenges sent by the security component.

Whether using cryptography keys or not, the authentication mechanisms are well known and are not described in detail so as not to burden unnecessarily the description of the present invention. Examples include authentication mechanisms using known algorithms such as the RSA, DES or triple DES algorithms.

Authentication of the subscriber smart card by the security component of the near-field communication module can be requested either at the start of a session to exchange information with the security component or systematically on each exchange of information with the security component.

Furthermore, to enhance the security of the security component of the near-field communication module, the processor means of the security component can be specifically programmed to block access to the data in the security component in the event of unsuccessful authentication attempts.

The invention claimed is:

1. A method of securing access of a near-field communication module in a terminal to a security device configured to be blocked remotely, said near-field communication module comprising a security component connected to a wireless communication device, the method comprising the steps of:
   storing security data in the security device;
   authenticating, by the security component of the near-field communication module, said security device as a function of the security data stored in the security device, said authenticating comprising:
      in response to an authentication request sent by the security component, consulting, by the security device, a file state parameter of a specific file in a memory of the security device; and
      allowing or blocking transmission, by the security device, of the security data to the security component in response to said authentication request as a function of the state of the file state parameter; and
   remotely blocking access to said security data by remotely accessing via a telecommunication network the specific file in the memory of the security device and setting the file state parameter of the specific file to a blocked state such that said transmission of the security data to the security component blocked.

2. The method according to claim 1, wherein a personal identification number is stored in said security device during the step of storing security data in the security device.

3. The method according to claim 2, wherein the security device protects each personal identification number when each personal identification number is stored.

4. The method according to claim 2, wherein the terminal includes an operating system to provide communication between the security device and the security component of the near-field communication module and during the authentication step the operating system sends the security component of the near-field communication module at least one personal identification number stored in the security device, each said at least one personal identification number sent being compared with a code prestored in the security component of the near-field communication module.

5. The method according to claim 1, wherein a cryptography key is stored in said security device during the step of storing security data in the security device.

6. The method according to claim 5, wherein the terminal includes an operating system to provide communication between the security device and the security component of the near-field communication module and during the authentication step the security device effects an electronic signature using the cryptography key in response to an authentication request sent by the security component of the near-field communication module and forwarded by the operating system, said signature being returned to said security component by the operating system for verification.

7. A security device configured to be blocked remotely and configured to be included in a terminal including a near-field communication module, said near field communication module comprising a security component connected to a wireless communication device, the security device comprising:
   a memory configured to store security data; and
   a processor configured to transmit one of said security data and data calculated from said security data in response to a request for authentication of the security component of the near-field communication module said authentication comprising:
      in response to said authentication request sent by the security component, consultation, by the security device, of a file state parameter of a specific file in a memory of the security device; and
      allowing or blocking transmission, by the security device, of the security data to the security component in response to said authentication request as a function of the state of the file state parameter;
   wherein the security device is further configured to block transmission of one of the security data and the data calculated from the security data to the security component of the near-field communication module by remotely accessing via a telecommunication network the specific file in said memory configured to store the security data and setting the file state parameter of the specific file to a blocked state such that said transmission of the security data to the security is blocked.

8. The security device according to claim 7, wherein the security data includes at least one of a personal identification number and a cryptography key.

9. A terminal comprising the security device according to claim 7 and the near-field communication module including the security component, connected to the wireless communication device and configured to be included in the terminal including the security device in which said security data is stored, wherein the near-field communication module comprises an authentication processor configured to authenticate the security device as a function of the security data stored in the security device.

\* \* \* \* \*